United States Patent
Pace

(10) Patent No.: US 6,681,865 B2
(45) Date of Patent: Jan. 27, 2004

(54) ROTARY CUTTING DEVICE WITH QUICK-RELEASE BLADES

(75) Inventor: Charles E. Pace, Warren, OH (US)

(73) Assignee: Warwood Products, Inc., Orwell, OH (US)

( * ) Notice: Subject to any disclaimer, the term of this patent is extended or adjusted under 35 U.S.C. 154(b) by 0 days.

(21) Appl. No.: 10/172,203

(22) Filed: Jun. 14, 2002

(65) Prior Publication Data

US 2003/0230418 A1 Dec. 18, 2003

(51) Int. Cl.[7] .............................................. A01B 33/06
(52) U.S. Cl. .......................... 172/111; 172/41; 56/17.5; 56/249.5; 30/276
(58) Field of Search ............................. 172/41, 42, 111, 172/110, 378, 125; 56/12.7, 17.5, 255, 249.5, 249; 30/500, 276, 347

(56) References Cited

U.S. PATENT DOCUMENTS

| 4,107,841 A | * | 8/1978 | Rebhun ........................ 30/276 |
| 4,313,297 A | * | 2/1982 | Maier ........................... 56/295 |
| 4,406,065 A | * | 9/1983 | Kohler ......................... 30/347 |
| 4,856,194 A | * | 8/1989 | Lee ............................... 30/276 |
| 5,617,636 A | * | 4/1997 | Taggett et al. ................ 30/276 |
| 5,622,035 A | * | 4/1997 | Kondo et al. ................ 56/12.7 |
| 5,640,836 A | * | 6/1997 | Lingerfelt ..................... 56/255 |
| 5,722,172 A | * | 3/1998 | Walden ........................ 30/347 |
| 5,791,054 A | * | 8/1998 | Bessinger ..................... 30/276 |
| 5,852,876 A | * | 12/1998 | Wang ........................... 30/276 |
| 6,052,907 A | * | 4/2000 | Wang ........................... 30/276 |
| 6,112,416 A | * | 9/2000 | Bridges et al. ............... 30/276 |
| 6,119,350 A | * | 9/2000 | Sutliff et al. ................. 30/276 |
| 6,249,978 B1 | * | 6/2001 | Sheldon ....................... 30/276 |
| 6,427,341 B1 | * | 8/2002 | Lee .............................. 30/347 |

FOREIGN PATENT DOCUMENTS

WO    wo 99/30552    *   6/1999

* cited by examiner

Primary Examiner—Victor Batson
(74) Attorney, Agent, or Firm—Fay, Sharpe, Fagan, Minnich & McKee, LLP

(57) ABSTRACT

A rotary cutting device or element (20) includes a base or support housing (30) with a centrally arranged fastening region (32) adapted to operatively connect with an associated drive (24) that rotates the element (20) about a first rotational axis (44). The support housing (30) further includes an outer edge or periphery (50) disposed away from the centrally arranged fastening region (32). At least one cutting tool (22), including a proximate end (52), is selectively attachable to the support housing (30) at the outer edge or periphery (50) thereof. Preferably, a spring biased retaining member (72) is engaged with the proximate end (52) of the cutting tool (22) to thereby secure the same to the support housing (30).

15 Claims, 7 Drawing Sheets

ROTARY CUTTING DEVICE WITH QUICK-RELEASE BLADES

BACKGROUND OF THE INVENTION

The present invention relates to the horticultural and/or lawn care arts. It is especially relevant to the selective cutting, trimming, or removal of unwanted weeds, overgrown grasses, and other vegetation or plants. It finds particular application in connection with power trimmers or weed whackers, and will be described with particular reference thereto. However, it is to be appreciated that the present invention is also amenable to other like applications which employ a rotary cutting tool or device, e.g., lawn mowers, brush choppers and other landscaping and gardening equipment.

In the horticultural and/or lawn maintenance fields, a wide range of power-driven equipment for cutting or trimming unwanted growth is employed. For large area cutting such as for mowing lawns or fields, equipment such as, riding mowers, push or self-driven power mowers, brush choppers and the like, are commonly employed. This type of equipment is often wheel based such that it supported by and rolls across the area to be cut. It typically includes one or more rotating cutting tools (e.g., a sharpened blade of steel, or another hard metal) powered by a combustion engine, an electric motor, or another type of drive. The rotating cutting tool in much of this type of equipment is position at a selected height substantially horizontal to the surface of the area being cut. As the equipment traverses the area, e.g., on its wheels, the underlying grass or other vegetation is cut at a uniform height corresponding to the separation of the rotating cutting tool from the ground.

One piece of equipment, which is typically a hand-held and/or hand-operated power-driven cutting or trimming device, is known in the art as a power trimmer or weed whacker. Power trimmers are commonly used for selectively cutting or trimming unwanted vegetation in places or regions unsuited and/or inhospitable to the aforementioned large area cutting equipment, e.g., at lawn edges; near garden beds; around fences, trees or other obstacles; in tight or confined areas where larger equipment will not readily fit; in other areas where artificial fixtures or plants such as flowers or vegetables are desirably left unscathed; on uneven or heavily sloped terrain which is difficult to negotiated by equipment which rests on the ground; etc. In a typical embodiment, a weed whacker includes an elongated shaft having a handle or other grip disposed at a first end, and a rotary cutting element or device disposed at an opposite cutting end. A drive, such as a combustion engine, an electric motor or otherwise, is often arranged on the weed whacker to power the rotating cutting element via a drive shaft or other linkage.

In operation, a user holds the weed whacker by the handle or grip end (i.e., the operating end) and guides the cutting end into the overgrown grass, weeds, or other unwanted plant growth which is to be trimmed or cut. In a typical embodiment, the rotating cutting element includes a cutting tool which rotates rapidly under the influence of the operating motor and which strikes and cuts the targeted plant stems, branches, leaves, etc., in a rapid cutting motion which minimizes damage to the remaining uncut portion of the targeted plant. Optionally, the operating end also includes a trigger or other switch for selectively engaging the rotary cutting device or element, a throttle lever for controlling engine speed, and similar or other operating controls.

In some known power trimmer or weed whacker embodiments, the cutting tool is a blade made of steel or other hard material which is integrally attached to the rotating cutting element and radially extends outward therefrom. A blade has advantages in cutting strength and in durability. However, the blade edge wears down over time. When the blade edge becomes sufficiently dulled, it has to be re-sharpened or replaced. Due to its integral construction, replacement typically involves a replacement of the entire rotating cutting element or device. Sharpening also typically involves removal of the whole rotary cutting element. In either case, the detachment can involve tools such as a wrench which may not be readily available in the field. Detachment of the rotating cutting element can also be complicated by corrosion of the bolt or other fastener which secures it to the trimmer, e.g., due to extended exposure of the rotating cutting element to moisture and other contaminants. In any event, the removal of the entire rotary cutting device can be an inefficient and disadvantageously time consuming process. For commercial users especially, in addition to being a bother, the time expended in such efforts is lost time with respect to getting jobs completed. With heavy use, this lost time can add up quickly. Additionally, the "in service" to "down time" ratio for the trimmer is disadvantageously impacted to the extent maintenance time is increased by such inefficiencies.

Blade damage can be accelerated by inadvertent impacts with rocks, tree trunks, and other hard object. Such impacts can cause a catastrophic blade fracture or other failure. Because the cutting end is manually guided, such impacts are to be expected at least occasionally. The difficulty and expense in re-sharpening or replacing the blade typically dictates using a very hard, durable blade material such as steel. However, although any manually guided rotating cutting element presents a safety hazard, a rigidly attached steel blade can be especially dangerous. The steel blade is relatively inflexible and cannot bend around or flex to avoid or lessen the full impact with objects inadvertently struck. The inflexibility combined with the blade hardness tends to result in substantial injury or damage to the struck object or the blade.

In part, to avoid some of the aforementioned difficulties, in other known weed whacker embodiments the cutting tool is a length of nylon string or similarly tough but flexible material connected to the rotary cutting element. Under rapid rotation, an end of the nylon string is drawn radially out and away from the axis of rotation by centrifugal force to form an elongated whip suitable for the cutting tasks. In a typical arrangement, the rotating cutting element includes a reel of nylon thread which is selectively unreeled, e.g., in a stepped fashion, to provide a controlled length for cutting and/or replace length as the nylon thread disintegrates or otherwise shortens due to wear.

Flexible elongated elements such as nylon thread can bend around or flex to avoid or lessen the impact with an object, and can therefore be safer than a rigidly attached inflexible blade. However, the highly abrasive cutting can quickly disintegrate the comparatively soft nylon string, requiring inconvenient repeated operation of the unreeling mechanism to maintain a usable length. When all the string on the reel is used up, it typically has to be replaced. Hence, the same disadvantages previously described with respect to the integral blade cutting tool are encountered. Both the unreeling mechanism and the reel replacement can be complicated by grass clippings and other contaminants which can jam up the unreeling mechanism. Furthermore, the bending and flexing of the flexible string which beneficially improves safety also substantially limits cutting strength, so that nylon string weed whackers are usually limited in application to light duty cutting tasks. Further, the nylon string can tend to be come tangled which in turn demands further maintenance.

The present invention contemplates a new and improved rotary cutting device with quick-release blades and/or an associated method that overcomes the above-mentioned limitations and others.

BRIEF SUMMARY OF THE INVENTION

In accordance with one embodiment of the present invention, a rotary cutting device is provided. The rotary cutting device includes base having: a coupling region adapted for connection of the base with an associated drive that rotates the base; a slot at a periphery of the base; and, a hollow shaft in communication with the slot. A retaining member arranged in the hollow shaft is movable between a first position wherein the retaining member intersects the slot and a second position wherein the retaining member does not intersect the slot. A cutting tool has a proximate end and a cutting region extending therefrom. The proximate end is arranged to be received in the slot and has an opening arranged to receive the retaining member therethrough when the retaining member is in the first position.

In accordance with another embodiment of the present invention, a horticultural apparatus includes a drive and a base operatively connected to the drive for selective rotation thereby. The base has a peripheral opening, and a cutting tool having a proximate end is received into the peripheral opening. A retaining member is arranged in the base. The retaining member is movable between a first position in which the retaining member is engaged with the cutting tool to secure the cutting tool to the base and a second position in which the retaining member is disengaged from the cutting tool to release the cutting tool from the base.

In accordance with yet another embodiment of the present invention, a rotary cutting element is provided to which a cutting tool is selectively secured. The rotary cutting element has a centrally arranged fastening region adapted to operatively connect with a drive that rotates the rotary cutting element, and a periphery having a slot adapted to receive an end the cutting tool. A recess is in communication with the slot, and a retaining member arranged in the recess. The retaining member is slidable between a first position wherein the retaining member intersect the slot and a second position wherein the retaining member does not intersect the slot. A spring biases the retaining member toward the first position.

One advantage of the present invention resides in the capability to provide for quick and easy cutting tool attachment to and/or detachment from a rotary cutting device or element.

Another advantage of the present invention resides in the capability to remove and/or secure cutting tools to a rotary cutting device in the field without resort to tools such as a wrench or the like.

Yet another advantage of the present invention resides in the capability to lower the down time for horticultural equipment by increasing the ease and speed at which cutting tool maintenance and/or replacement can be carried out.

Numerous additional advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE INVENTION

Figure 1:
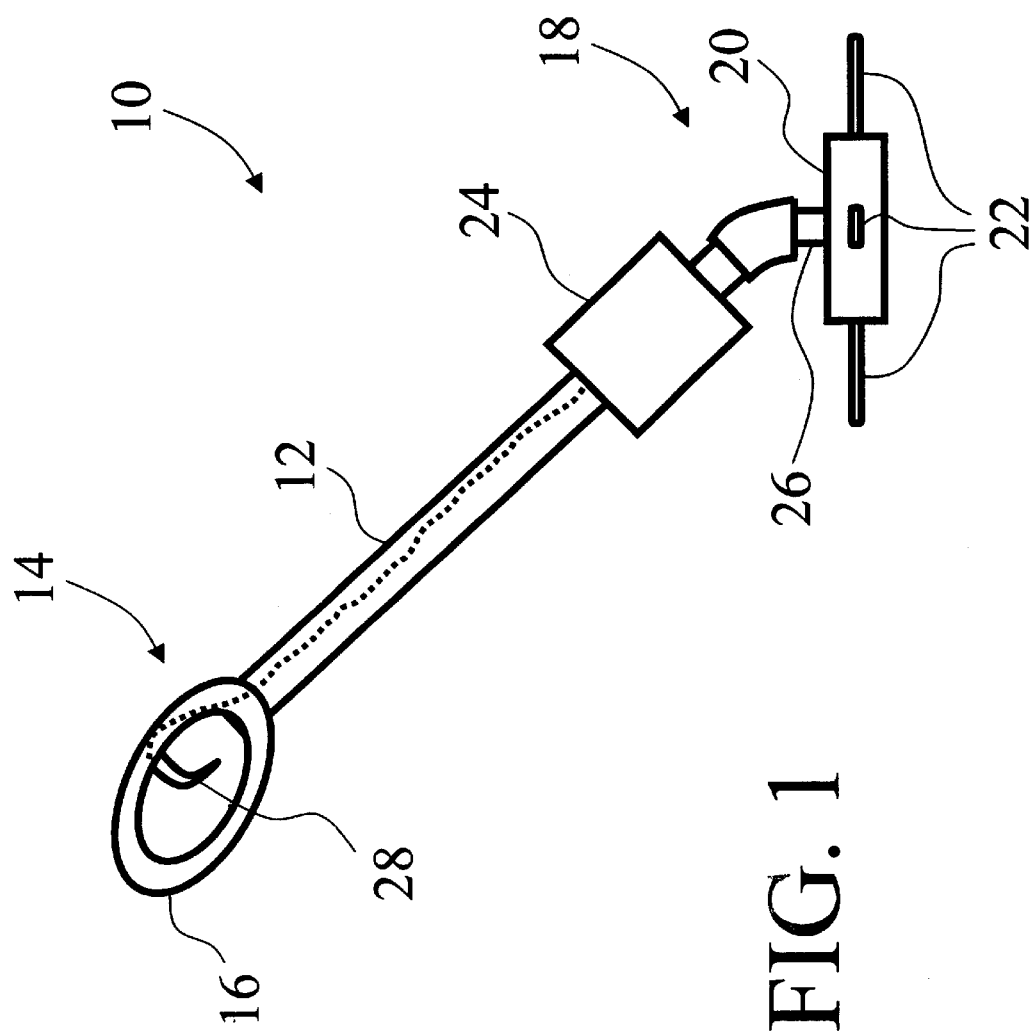
FIG. 1 shows an exemplary power trimmer in accordance with aspects of the present invention.

With reference to FIG. 1, a weed whacker or power trimmer 10 includes an elongated shaft or supporting member 12 connecting a first operating end 14 and an opposing second cutting end 18. At the first operating end 14, a handle or grip 16 is arranged for manually holding, operating and/or guiding the trimmer 10. At the second cutting end 18, a rotary cutting device or element 20 includes one or more cutting tools 22 that rotate about responsive to a rotation of the cutting element 20.

Preferably, the trimmer 10 also includes a drive 24, such as a combustion engine, an electric motor or otherwise, that selectively powers the trimmer 10. In response to a user's manipulation of an operating control 28, such as a trigger, on/off button, etc., the drive 24 effects rotation of the rotary cutting device or element 20, e.g., via a drive shaft 26 or other linkage operatively connected with the rotating cutting element 20.

Figure 2:
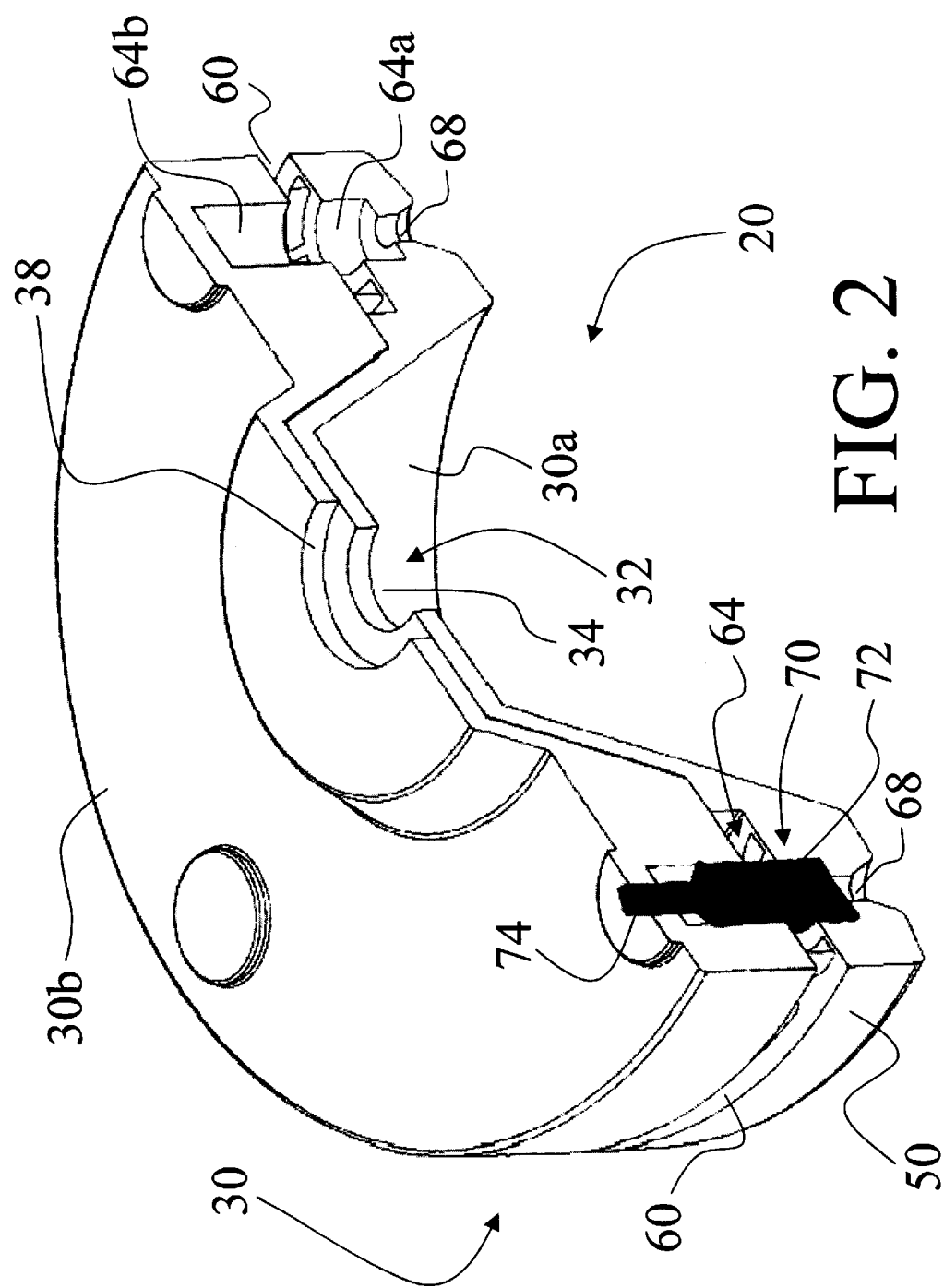
FIG. 2 shows a partially cut-away perspective view of the rotary cutting device shown in FIG. 1 with the cutting tools removed and with one retention assembly removed.
Figure 3:
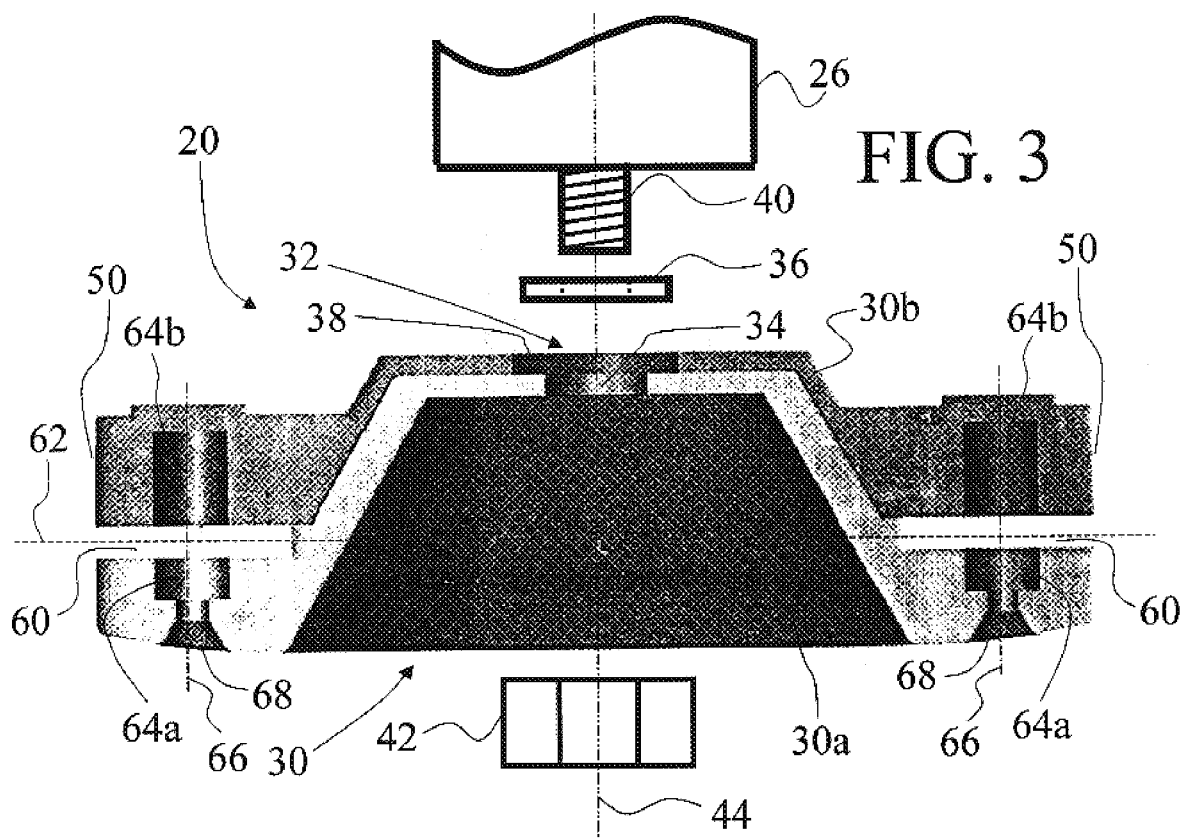
FIG. 3 shows a cross-sectional view of the rotary cutting device shown in FIG. 1 with the cutting tools and the retention assemblies removed.
Figure 4:
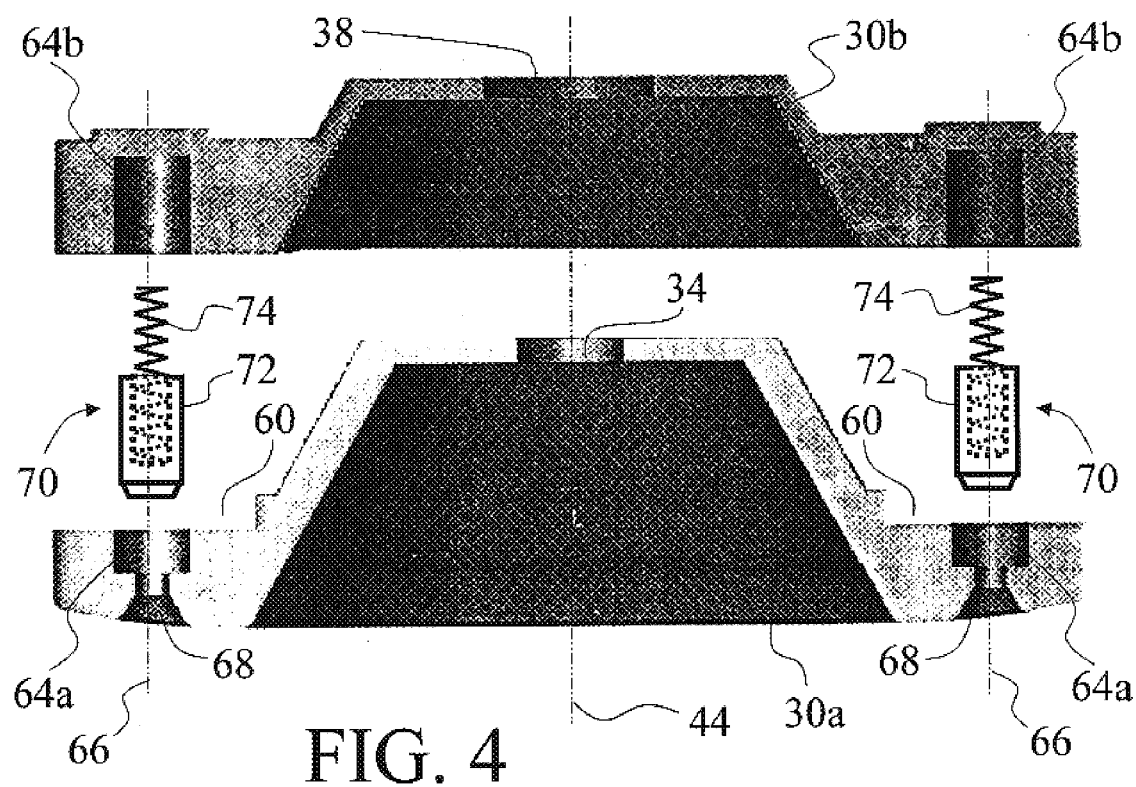
FIG. 4 shows an exploded cross-sectional view of the rotary cutting device shown in FIG. 1 with the cutting tools removed.

With added reference to FIGS. 2–4, in a suitable embodiment, the rotating cutting element 20 includes a base or support housing 30 optionally formed of two mating pieces 30a, 30b which are rigidly connected to one another by one or more screws, bolt/nut combinations, clamps, adhesive, or other fasteners (not shown). The support housing 30 has a centrally arranged fastening region 32 for attaching the cutting element 20 to the drive shaft 26 or other suitable rotating drive member. As shown, the fastening region 32 includes a central opening 34 in the first or bottom housing piece 30a, and a central opening 38 in the second or top housing piece 30b.

Preferably, an adaptor 36 is configured to receive a connecting bolt 40 or other fastening portion or connecting end of the drive shaft 26. The adaptor 36 suitably includes a washer having an outer diameter conforming with the opening 38 arranged in the second housing piece 30b. As shown, the opening 38 cooperates with the first housing piece 30a to create an annular recess about the central opening 34 for receiving the washer 36. The inner diameter of the adaptor 36 is sized to match an outer diameter of the drive shaft 26 or a tip connecting portion thereof. Optionally, a plurality of different-sized adaptors 36 are available. In this manner, the assortment of adaptors 36 with different inner diameters allow the same cutting element 20 to be tailored for connection to and/or use with a variety of trimmers having different diameter connecting ends.

In the illustrated embodiment, a nut 42 cooperating with the threaded portion or bolt 40 at the shaft tip secures the cutting element 20 to the shaft 26 via the fastening region 32. However, other fasteners can be employed. In this manner, the secured rotating cutting element 20 is affixed to the shaft 26 and rotates about a rotational axis 44 responsive to the rotation of the drive shaft 26.

Figure 5A:
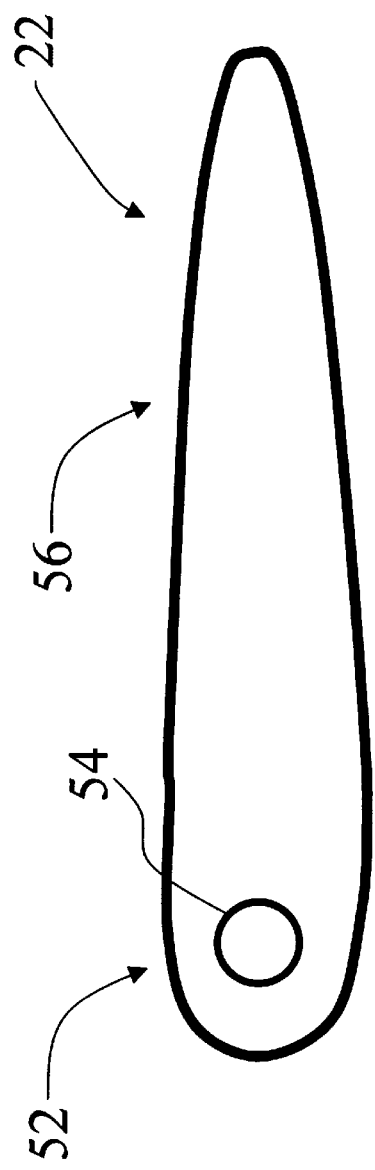
FIG. 5A shows a top view of one of the cutting tools shown in FIG. 1.
Figure 5B:
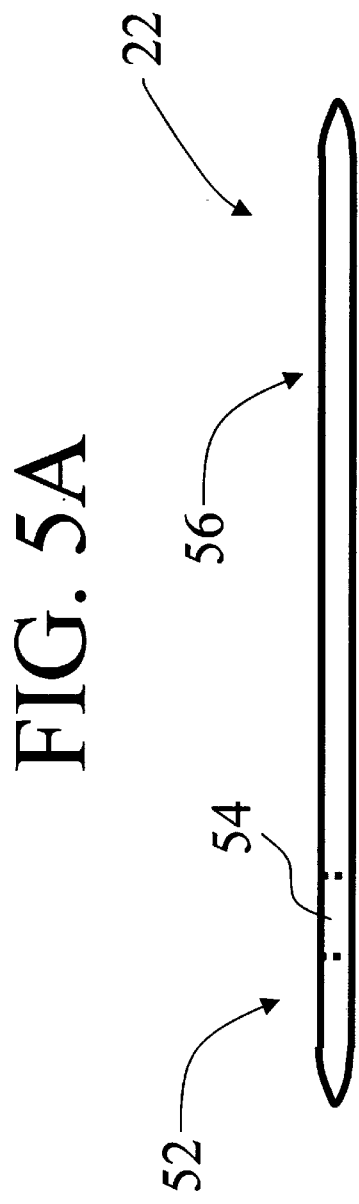
FIG. 5B shows a side view of one of the cutting tools shown in FIG. 1.
Figure 6:
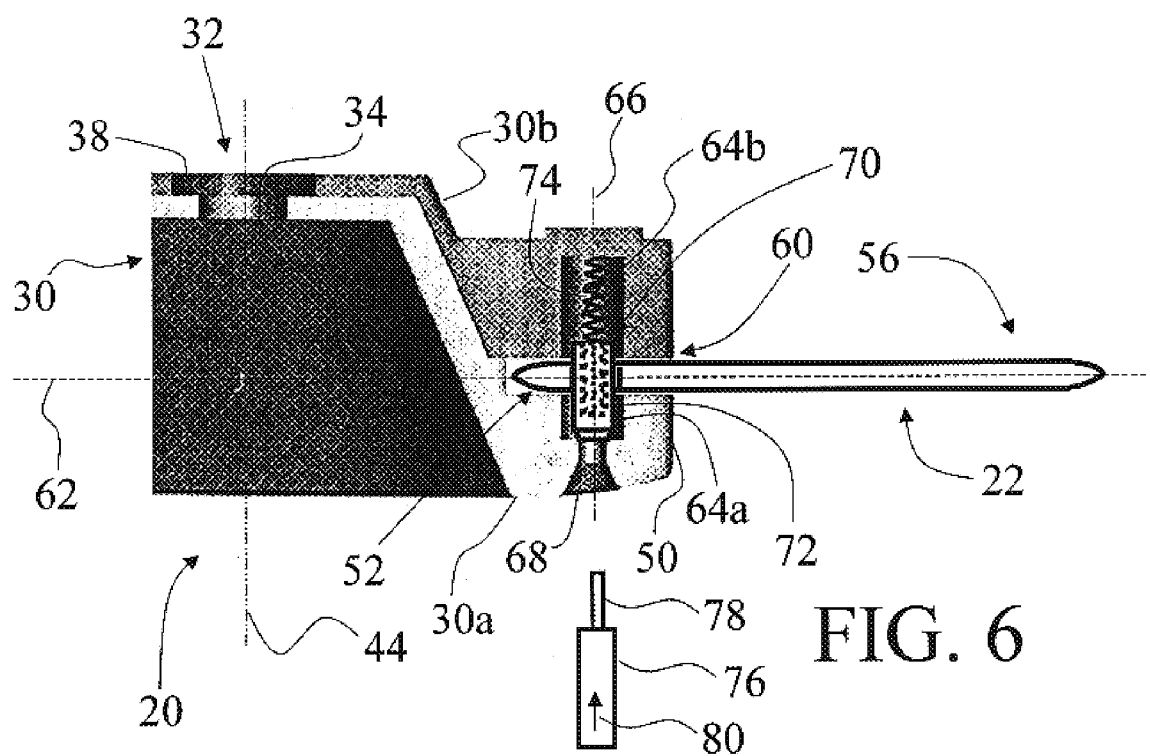
FIG. 6 shows a partial cross-sectional view of the rotary cutting device shown in FIG. 1 with an installed cutting tool, and also shows an instrument/key suitable for use in selectively removing and installing the cutting tools.

With added reference to FIGS. 5A and 5B and FIG. 6, in one suitable embodiment, a plurality of the cutting tools 22 (preferably 3 to 5, more preferably 4) are arranged about a periphery or outer edge 50 of the support housing 30. The outer edge 50 is arranged distally from the central fastening region 32. As the support housing 30 is rotated about the first rotational axis 44 the outer edge 50 experiences a centrifugal force directed radially outward from the rotational axis 44.

Preferably, each cutting tool 22 includes: a substantially flat member at a proximate end 52 with an opening 54 therein adapted for rotatable attachment of the cutting tool 22 to the outer edge 50 of the support housing 30; and, a cutting region 56 extending outwardly from the proximate end 52 and being adapted for cutting or trimming vegetation. In the illustrated embodiment, the cutting region 56 is an extension of the substantially flat member at the proximate end 52, having sharpened edges to form a blade. While a particular blade shape is shown in FIG. 5A, it is to be appreciated that other shapes are also contemplated, such as a scythe or crescent, a rectangle, a triangle, etc. Further, while a blade is illustrated, it is to be appreciated that the cutting tool 22 may also use some other type of cutting device, e.g., the cutting region 56 may constitute a whip attached to the substantially flat member at the proximate end 52.

In the illustrated embodiment, the periphery edge 50 includes an annular slot 60 defined by a separation of the housing pieces 30a, 30b at the edge 50. The slot 60 defines a plane 62 (indicated by a dashed line in FIGS. 3 and 6) which is substantially perpendicular to the rotational axis 44. Spaced about the circumference, the periphery region also includes a plurality of cylindrical or otherwise shaped hollow shafts or recesses 64 (see, e.g. FIG. 2) corresponding in number to the plurality of cutting tools 22. An axis 66 of each recess 64 defines a second rotational axis which is substantially parallel to the first axis of rotation 44 but radially displaced therefrom, and which is also substantially perpendicular to the plane 62. Each recess 64 includes a first recess portion 64a formed into the first housing piece 30a, and a second recess portion 64b formed into the second housing piece 30b. As shown, the recess portion 64b is deeper than the recess portion 64a. The recess portions 64a, 64b meet at the slot 60 so that when combined the cylindrical recess 64 intersects the slot 60. Furthermore, openings 68 are included in the first housing piece 30a which correspond to the recess portions 64a and communicate therewith. The openings 68 preferably include a smaller diameter than the recess portion 64a.

A retention assembly 70 cooperates with the opening 54 of the proximate end 52 of the cutting tool 22 to rotatably retain the proximate end 52 of the cutting tool 22 in the slot 60. In a suitable embodiment, a retaining member or shaft 72 and a biasing spring 74 are arranged in each recess 64 as shown. Optionally, as shown, e.g., in FIGS. 4 and 6 in phantom, the shaft 72 includes a hollow recess into which the spring 74 extends to maintain proper alignment of the pair.

The shaft 72 is preferably cylindrical with a central axis coinciding with the second rotational axis 66 of the corresponding recess 64. The outer diameter of the shaft 72 is larger than the inner diameter of opening 68 so that it cannot pass therethrough. The biasing spring 74 biases the shaft 72 to pass through the slot 60 and into the recess portion 64a arranged in the first housing piece 30a. In this biased position (shown, e.g., in FIG. 6), the shaft 72 intersects the slot 60. However, a key or instrument 76 having a suitably narrow tip 78 can be pushed (schematically indicated by an arrow 80) into the opening 68 to oppose and overcome the biasing force produced by the spring 74 and push the entire shaft 72 into the larger recess portion 64b of the second housing piece 30b thereby freeing up the gap between the recess portions 64a, 64b defined by the slot 60. To facilitate the insertion of the tip 78 into the opening 68, the opening 68 optionally has a portion with a varying diameter shaped as a frustum of a cone as illustrated in FIGS. 2–4 and 6.

The preferred operation of the illustrated retention assembly 70 is as follows. The instrument 76 is inserted through the opening 68 to push (in the direction of arrow 80) the shaft 72 out of the gap defined by the slot 60 and into the recess portion 64b. The proximate end 52 of the cutting tool 22 is inserted along plane 62 into the gap 60 until it contacts or nearly contacts the tip 78 of the instrument 76. The tip 78 is preferably narrower than the shaft 72. Hence, when the tip 78 is withdrawn, the shaft 72, under the biasing force of the spring 74, will contact the proximate end 52 of the cutting tool 22 and be prevented from passing through the gap defined by slot 60 and entering into the recess portion 64a. With the tip 78 withdrawn, the proximate end 52 of the cutting tool 22 is pushed further into the slot 60 until the opening 54 overlaps the shaft 72, at which position the shaft 72 is no longer restrained by the proximate end 52. Accordingly, under the biasing force of the spring 74, the shaft 72 is made to pass through the opening 54 and into the first recess portion 64a. In this manner, the cutting tool 22 is readily and quickly installed such that the biased shaft 72 retains the cutting tool 22 at the periphery 50 of the cutting element 20. The cutting tool 22 is however free to rotate about the shaft 72 whose axis of symmetry coincides with second rotational axis 66.

To remove the elongated cutting element 22, the instrument 76 is inserted through the opening 68 to push (in the direction of arrow 80) the shaft 72 out of the gap defined by the slot 60 and into the recess portion 64b. The elongated cutting element 22 is withdrawn along plane 62 from the slot 60 so that the opening 54 is no longer coaxial with the second rotational axis 66 and a portion of the proximate end 52 overlaps the shaft 72. Once again, this overlap is enabled by the tip 78 having a smaller cross-section than the shaft 72. The instrument 76 is then withdrawn from the opening 68, at which point the shaft 72 is prevented by the aforementioned overlap from passing through the gap defined by slot 60 and entering into the recess portion 64a. The cutting tool 22 is then completely withdrawn from the slot 60, during which withdrawing the proximate end 52 unblocks the gap defined by slot 60 so that the biasing spring 74 pushes the shaft 72 back into the first recess portion 64a. In this manner, the cutting tool 22 is readily and quickly detached from the cutting element 20.

It should be appreciated that, although a particular instrument 76 is shown for assisting in installing and removing the cutting tools 22, a specialized key, wrench or other tool is typically unnecessary. Rather, other commonly available objects having sufficiently narrow and sturdy tips can be used, e.g., the tip of a sharpened pencil or pen, a screwdriver, scissor tips, the tip of a house key or car key or other like key, a simple stick, etc. Preferably, the applied tip is narrower than the shaft 72 to permit the proximate end 52 of the cutting tool 22 to overlap and block the shaft 72 when the tip is withdrawn.

In operation, the installed cutting tools 22 are free to rotate about the second rotational axis 66 except to the extent that the cutting region 56, i.e. the blade portion, impinges upon the support housing 30. As the support housing 30 is rotated by an associated drive shaft 26, a centrifugal force directed outwardly from the first rotational axis 44 develops in the vicinity of the outer edge 50. Under the influence of the centrifugal force, the cutting region 56 will tend to move radially outward away from the first rotational axis 44. Because the cutting tools 22 are free to rotate about their respective second rotational axes 66, they rotate so that their cutting regions 56 are substantially aligned with the outward direction of the centrifugal force thereby provide an effective cutting edge.

As the support housing 30 rotates and the cutting region 56 orients outwardly, the cutting tool 22 is in position to cut or trim unwanted weeds, overgrown grasses, and other vegetation or plants that impinge thereupon. However, if the cutting region 56 strikes a rock, tree trunk, or other hard and/or immobile object, which does not yield thereto, the cutting tool 22 pivots about the second rotational axis 66 responsive to the unyielding force thereby avoiding a substantial impact which could potentially damage the cutting tool 22 and/or the unyielding object struck.

Because the elongated cutting elements 22 are easily replaced, durability becomes less of a factor, and so there is greater flexibility in the selection of suitable materials. The material can be selected to balance blade durability with safety and ease of rotation. In one preferred embodiment, a molded nylon material is used to manufacture both the cutting tools 22 and the support housing 30. However, it is also contemplated to use steel or other metals, plastics, hard rubber, or like materials as desired depending on the application.

In a suitable method for assembling the rotary cutting element 20, the springs 74 and the shafts 72 of the retention assemblies 70 are each inserted into their respective recess portions 64b of the second housing portion 30b. The first housing portion 30a is then matingly placed onto the second housing portion 30b and fastened thereto by one or more screws, bolt/nut combinations, clamps, adhesives, or the like. The cutting tools 22 are then installed as previously described. Alternatively, for the initial assembly the cutting tools 22 can be installed prior to placement of the first housing portion 30a.

It is to be appreciated that the present invention is not limited to the power trimmer 10 shown in FIG. 1, but rather finds application in many types of horticultural and/or lawn care equipment which employ rotary cutting elements or devices, be it hand-operated, power-driven, or otherwise. For example, it will find application in other types of vegetation cutting and trimming applications, in soil tiling applications, as well as in other non-horticultural related fields that employ similar rotary cutting elements. Optionally, a lawn edger or rototiller may employ the rotary cutting device 20 in a vertical orientation with appropriately shaped and durable cutting tools 22. In such an embodiment, however, it may be desired to not have the cutting tools 22 pivot about their respective axes 66. Accordingly, the shape of the opening 54, recess 64 and shaft 72 may be square or otherwise suitably keyed so maintain the cutting tools 22 at desired rotationally fix orientations with respect to the axes 66. Alternately, rotation of the cutting tools 22 may be thwarted by employing a plurality of connection points for each tool 22, or the slot 60 and proximate ends 52 of the cutting tools 22 can be appropriately mated or keyed to prevent each tool's rotation.

Figure 7:
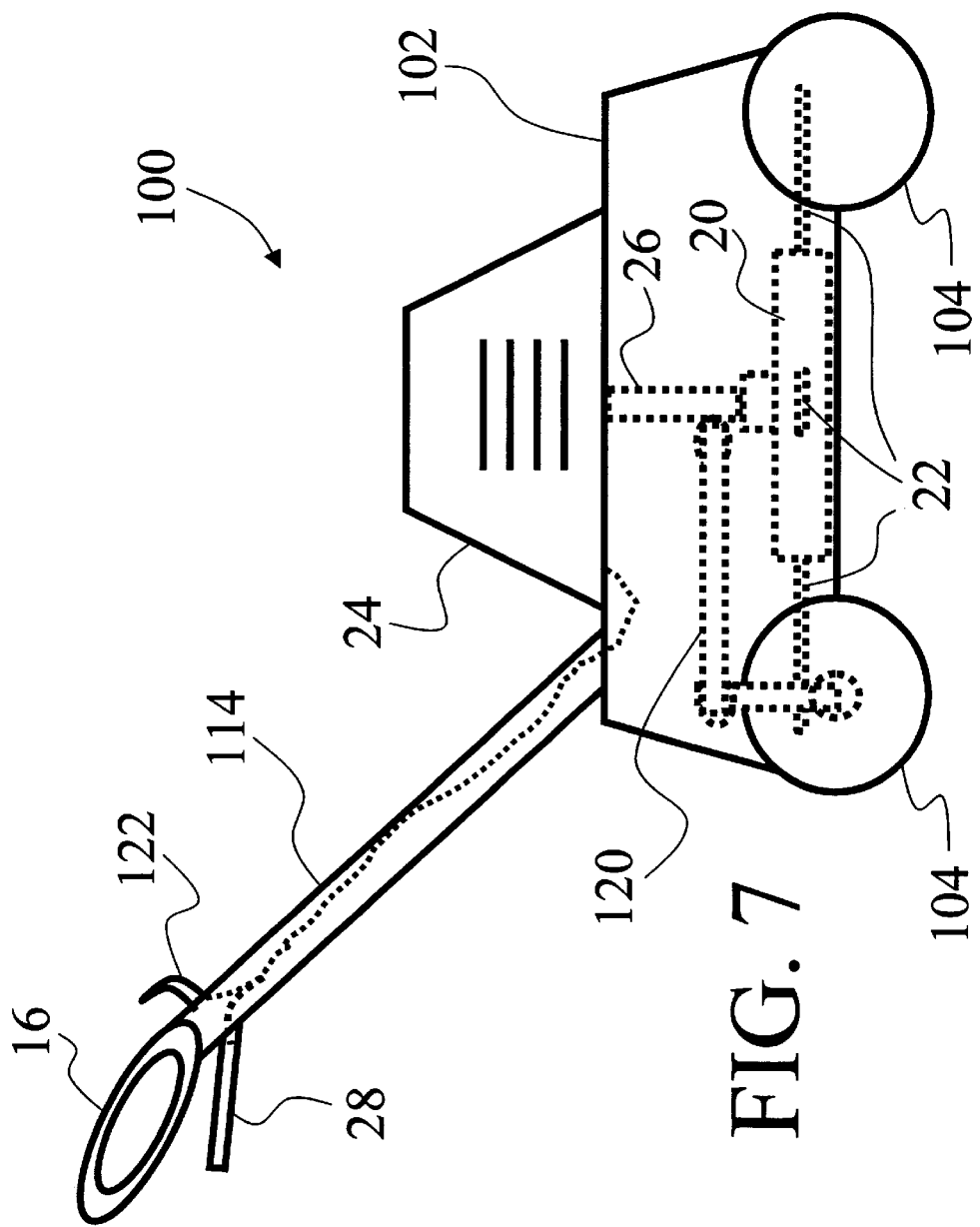
FIG. 7 shows a power mower employing a rotary cutting device or element (shown in phantom) in accordance with aspects of the present invention.

Furthermore, the size of the cutting element 20 and/or cutting tools 22 may selected as desired for particular applications. For example, with reference to FIG. 7, a push- or power-propelled lawn mower 100 includes a chassis 102 supported by and maneuverable on wheels 104. An driver 24, for example a combustion engine, electric motor or otherwise, is supported by the chassis 102 and selectively drives a drive shaft 26 which connects to and drives the rotating cutting element 20 which includes one or more cutting tools 22 that rotate about responsive to a rotation of the cutting element 20 by the drive shaft 26.

The lawn mower 100 further includes a handle 114 terminating in a grip 16 for operation and manipulation of the lawn mower 100. Preferably, the drive 24 effects rotation of the rotating cutting element 20 responsive to a user's manipulation of an operational control 28. The control 28 is preferably an engagement control which promotes safety by being biased to a disengaged position so as to ensure that the cutting element 20 does not rotate without deliberate action to manipulate the control 28. Accordingly, under normal operation, when the lawn mower 100 is left unattended the rotary cutting device 20 will not rotate. However, it is also contemplated to omit the control 28 and have the rotating cutting element 20 continuously operate responsive to the drive 24 running.

In a suitable embodiment, the lawn mower 100 is propelled about the ground manually, i.e., an associated user pushes the lawn mower 100 via the grip 16 on the handle 114. In another suitable embodiment, the drive 24 propels the lawn mower 100 by driving selected wheels 104, e.g., the rear wheels, via a mechanical or other linkage 120. The propelling is preferably responsive to the user operating a switch 122 which effects engagement of the power-propelling and/or selects a speed therefor. With either push or power propulsion, the associated user preferably steers using the grip 16 on the handle 114.

As shown, the lawn mower 100 is operated by a user who walks behind the lawn mower. However, a riding lawn mower or a mower or brush chopper which is attached to a tractor is also contemplated.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A rotary cutting device of comprising:
   a base, said base including:
      a coupling region adapted for connection of the base with an associated drive that rotates the base;
      a slot at a periphery of the base; and
      a hollow shaft in communication with the slot;
   a retaining member arranged in the hollow shaft, said retaining member being movable between a first position wherein the retaining member intersects the slot and a second position wherein the retaining member does not intersect the slot;

a spring arranged to bias the retaining member into the first position, the base having an opening communicating with the hollow shaft to admit an associated instrument into the hollow shaft for selectively sliding the retaining member against the biasing of the spring into the second position; and a cutting tool including a proximate end and a cutting region extending therefrom, said proximate end arranged to be received in the slot and having an opening arranged to receive the retaining member therethrough when the retaining member is in the first position.

2. The rotary cutting device of claim 1, wherein the hollow shaft is defined by a first recessed portion and a second recessed portion aligned on opposite sides of the slot such that the hollow shaft intersects the slot at an orientation substantially normal to a plane defined by the slot.

3. The rotary cutting device of claim 2, wherein the base is constructed of a first piece and a second piece connected together such that they cooperatively define the slot therebetween.

4. The rotary cutting device of claim 3, wherein the first piece includes the first recessed portion and the second piece includes the second recessed portion.

5. The rotary cutting device of claim 1, wherein the base includes a plurality of the hollow shafts, said plurality of hollow shafts containing a corresponding plurality of the retaining members biased by corresponding springs such that a plurality of the cutting tools are selectively securable to the base.

6. A horticultural apparatus comprising:

a drive;

a base operatively connected to the drive for selective rotation thereby, said base having a peripheral opening;

a cutting tool having a proximate end which is received into the peripheral opening; and a retaining member arranged in the base, said retaining member being movable between a first position in which the retaining member is engaged with the cutting tool to secure the cutting tool to the base and a second position in which the retaining member is disengaged from the cutting tool to release the cutting tool from the base, the base including an access opening that admits an associated instrument for selectively moving the retaining member into the second position.

7. The horticultural apparatus of claim 6, wherein said horticultural apparatus is selected from a power trimmer, a mower, an edger, a brush chopper or a rototiller.

8. The horticultural apparatus of claim 6, further comprising:

a spring which biases the retaining member to the first position.

9. The horticultural apparatus of claim 6, wherein the retaining member is movable by sliding translation between the first and second positions.

10. The horticultural apparatus of claim 6, wherein the access opening is narrower than a dimension of the retaining member.

11. The horticultural apparatus as set forth in claim 6, wherein the access opening includes a frustum shaped region.

12. The horticultural apparatus of claim 6, wherein the horticultural apparatus includes a plurality of retaining members such that a plurality of the cutting tools are selectively securable to the base.

13. A rotary cutting element to which a cutting tool is selectively secured, said rotary cutting element comprising:

a centrally arranged fastening region adapted to operatively connect with a drive that rotates the rotary cutting element;

a periphery having a slot adapted to receive an end of the cutting tool;

a recess in communication with the slot;

a retaining member arranged in the recess, said retaining member slidable between a first position wherein the retaining member intersects the slot and a second position wherein the retaining member does not intersect the slot;

a spring which biases the retaining member toward the first position; and an access port that admits an instrument for selectively moving the retaining member into the second position.

14. The rotary cutting element of claim 13, wherein the centrally arranged fastening region includes:

an opening said opening having a first diameter.

15. The rotary cutting element of claim 14, wherein the centrally arranged fastening region further includes:

an annular recess disposed about the opening, said annular recess adapted to receive a washer having a selected inner diameter less than or equal to the first diameter.

* * * * *